April 8, 1958 G. L. VARVEL 2,829,585
ATTACHMENT TO BALER TO AGITATE TWINE FEEDER TUBE
Filed June 25, 1956 2 Sheets-Sheet 1

INVENTOR
Gerald L. Varvel
BY Beale and Jones
ATTORNEYS

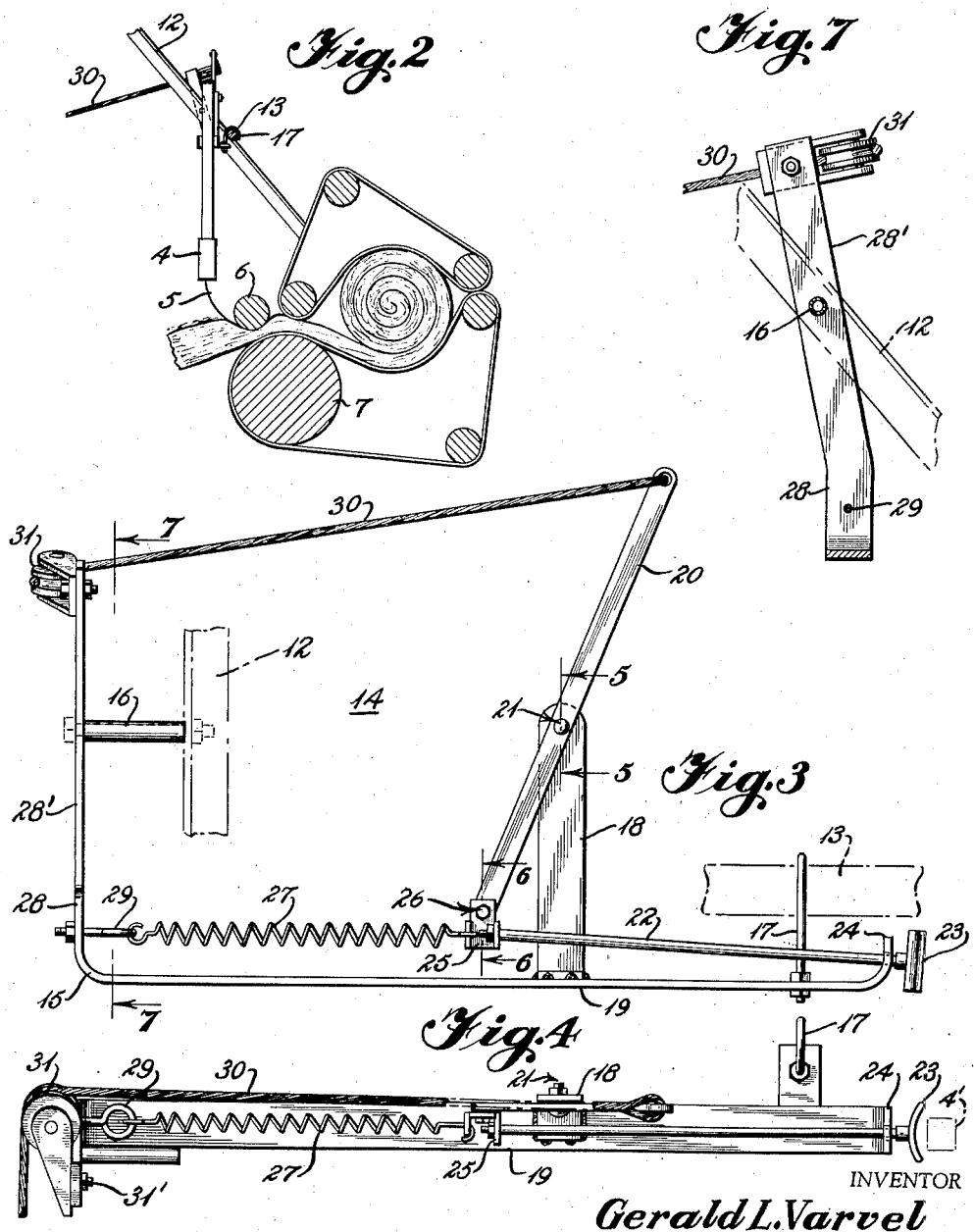

United States Patent Office 2,829,585
Patented Apr. 8, 1958

2,829,585

ATTACHMENT TO BALER TO AGITATE TWINE FEEDER TUBE

Gerald L. Varvel, Gering, Nebr., assignor of one-half to John H. Mead, Jr., Scottsbluff, Nebr.

Application June 25, 1956, Serial No. 593,675

7 Claims. (Cl. 100—5)

This invention relates to an attachment for balers and more particularly for roll type balers having a pivotally mounted binder twine feeder tube incorporated therein.

At present, in baling machines of the above mentioned type and such as are shown in the Harrier et al. U. S. Patent 2,667,729, a pivotally mounted binder twine feeder tube is suspended between a conveyor for carrying incoming material and a binding mechanism for forming and binding a bale of this material. The feeder tube is automatically swung to an extreme position for the start of the binding operation when each previously bound bale reaches a predetermined size. When the feeder tube reaches this starting position, the binder twine carried thereby is suspended between the incoming material and the binding mechanism. In order for the binding operation to begin, there must be sufficient incoming material to catch the twine and carry it into the binding mechanism. If the twine is not carried into the binding mechanism the binding operation will be delayed, making it necessary for the operator of the baler to dismount from the tractor or other baler propelling vehicle and by some means agitate the binder twine so that it will be carried into the binding mechanism and allow the binding operation to continue.

In order to overcome the inconvenience, hazardous condition and loss of time which arises from the operator's continuous mounting and dismounting from the propelling vehicle, my invention provides an attachment for balers of the above described type which enables the operator of the baler to agitate the twine feeder tube, and hence the binder twine itself, from his seat on the propelling vehicle. This agitation of the feeder tube and the twine therein causes the twine to be carried into the binding mechanism and thereby actuate the baling process.

It is, therefore, an object of this invention to provide an attachment for a baler of the type described which will enable the operator to agitate the binder twine feeder tube thereof from his position on the baler propelling vehicle and thereby initiate the bale binding operation.

Another object of this invention is to provide an attachment for a baler of the type described which is simple in structure and inexpensive to manufacture.

Still another object of this invention is to provide an attachment of the type described adapted to be easily installed on balers of the described type.

These and other objects of the invention will become apparent from the following disclosure of the application of the invention to a baler of the type hereafter described, although the application is not limited to this specific baler.

For a more complete understanding of the nature and scope of this invention reference may be had to the drawings in which:

Figure 2 is a cross-section along line 2—2 of Figure 1 and shows a partially formed bale of material in the baling mechanism;

Figure 3 is a side elevation of the attachment;

Figure 4 is a top elevation of the attachment;

Figure 7 is a cross-section along line 7—7 of Figure 3 showing how the attachment is mounted in the baler machine.

Figure 1:
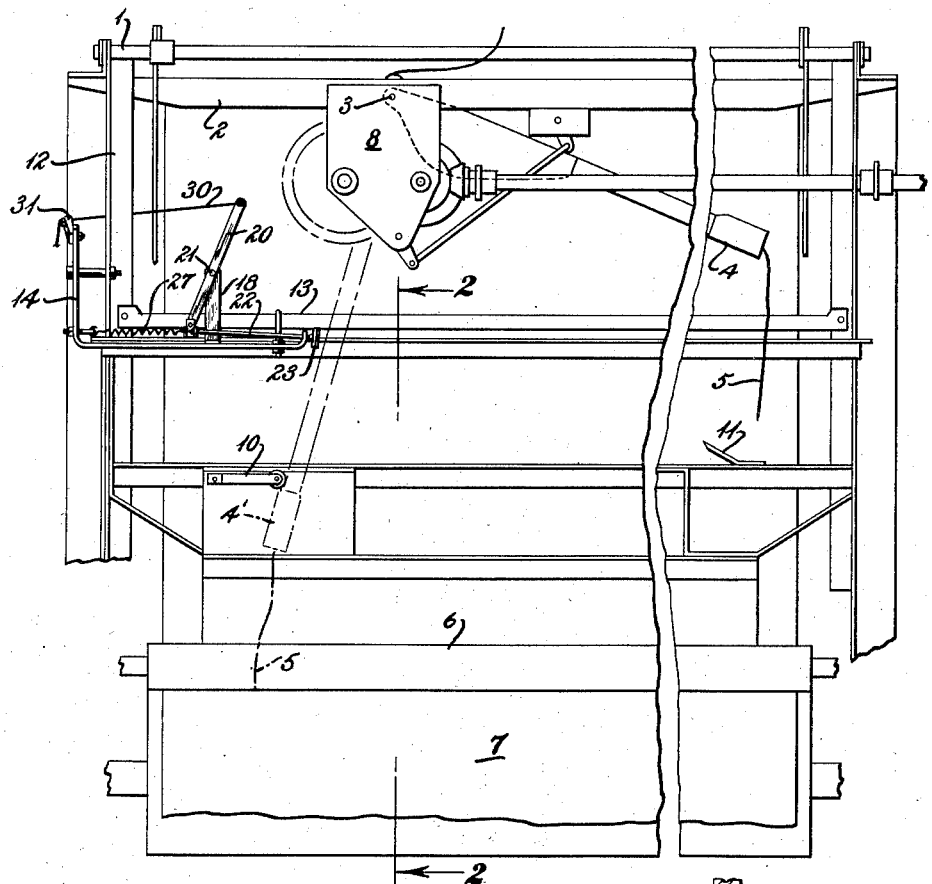
Figure 1 is a fragmentary front view of a baling machine incorporating the invention.

The relationship of the baler attachment to the baler itself is shown in Figure 1. The baler structure consists of a general framework 1 having a cross beam 2 on which is pivotally mounted by a pivot 3 a binder twine feeder tube 4 with binder twine 5 supported therein and fed therethrough. Below the general framework 1 are a pair of material feeding rolls 6 and 7 between which, incoming material must pass to be admitted to the bale binding mechanism such as shown in Figure 2.

The feeder tube 4 is controlled by a drive mechanism 8 which biases the feeder tube to the extreme dotted line position 4' through means of a spring or the like not shown and holds said feeder tube stationary against an abutment 10. While in this position 4' the binder twine 5 is suspended from the feeder tube and hangs at a position just in front of the material feeding rolls 6 and 7.

With the twine 5 in position 4', any incoming material which brushes against the twine 5 will carry said twine along with it into the material feeding rolls 6 and 7. As a result the twine will be placed under tension and this tension, through means of the mechanism 8 will cause the feeder tube 4 to be driven to the solid line position shown. A knife edge 11 is provided to sever the twine when the solid line position has been reached.

For the purpose of clarity the binding mechanism, the arrangement of the binder twine feeder tube 4, binder twine 5, the incoming material to be bound, the material feeding rolls 6 and 7 and the resulting bale of spiral cross-section is shown in Figure 2.

Mounted on an upright beam 12 and cross-brace 13 of the general framework 1 is a feeder tube agitating mechanism generally indicated at 14 which constitutes the subject invention.

Referring to Figures 3 and 4, the feeder tube agitating mechanism 14 is seen to consist of a right angle supporting bracket 15 which is mounted on the baler by a bolt and spacer tube arrangement 16 attached to the upright beam 12 of the baler framework and a supporting hook and lock nut arrangement 17 attached to the cross-brace 13 of said baler framework. A rigid arm 18 is welded to the horizontal arm 19 of the bracket 15 in perpendicular relation thereto.

A connecting link 20 is pivotally mounted at its center on the upper end of the arm 18 by means of a pivotal connection generally indicated at 21. A pusher rod 22 having a feeder tube engaging head 23 is reciprocably mounted in an upturned supporting flange 24 on the end of horizontal arm 19 of the supporting bracket 15 and is attached at one end to the lower end of the connecting link 20 by means of a bracket 25 pivoted at 26 to the connecting link 20 and having a socket for receiving an end of the pusher-rod 22. Also connected to the bracket 25 is one end of a coil spring 27 which is attached at its other end to the upright arm 28 of the supporting bracket 15 by means of an eye bolt 29. Spring 27 biases the pusher rod 22 to the position shown in Figures 3 and 4 this position being determined by the engagement of the feeder tube engaging head 23 with the supporting flange 24.

A rope or flexible cable 30 is attached to the upper end of the connecting link 20 and runs through a pulley 31 attached to the upper end of the vertical arm 28 of the supporting bracket 15. The rope 30 extends from the pulley 31, attached to the upper end of vertical arm 28 by a bolt 31', to a suitable point from which a force may be exerted on the rope 30 to actuate the connecting link 20 and in conjunction with the biasing spring 27, impart a reciprocating motion to the pusher rod 22.

Figures 5, 6:
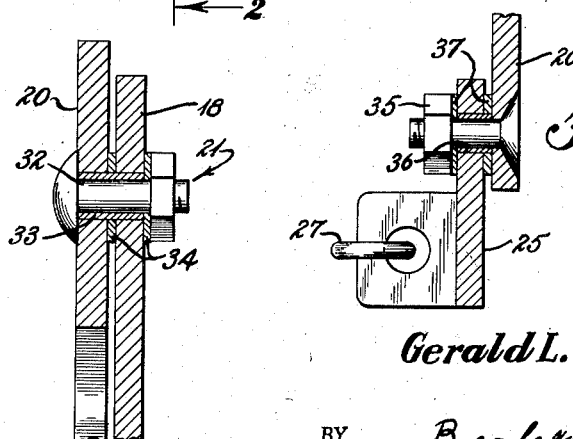
Figure 5 is a cross-section along line 5—5 of Figure 3.
Figure 6 is a cross-section along line 6—6 of Figure 3.

The pivotal connection generally indicated at 21 between the rigid arm 18 and the connecting link 20 is shown in Figure 5 and comprises a nut and bolt assembly 32, bushing 33 and spacers 34.

Figure 6 shows the pivotal connection generally indicated at 26 between the connecting link 20 and bracket 25 which supports the spring 27 and the pusher rod 22. Bracket 25 is attached to the connecting link 20 by means of a nut and bolt assembly 35, a bearing 36 and spacers 37. The end of the spring 27 is shown attached to the bracket 25.

In order that the rope 30 will ride evenly in the pulley 31, the upper portion 28' of the vertical arm 28 of the bracket 15 is offset at an acute angle with respect to vertical arm 28 as shown in Figure 7.

Pulley 31 is mounted on the upper end of the offset portion 28' of the vertical arm 28, with the axis of rotation of the pulley 31 being in parallel relationship with said offset portion 28' of the arm 28.

Referring again to Figure 1, the operation of the feeder tube agitating attachment will be described. The feeder tube 4 is spring biased to its dotted line position 4' whereby the binder twine 5 is suspended in front of the material feeding rolls 6 and 7. If there is insufficient material coming into the feeding rolls to carry the binder twine 5 into the binder mechanism, the binding operation will not begin. The operator of the baler, from his position on the baler propelling vehicle simply exerts a pull on the rope 30 which through means of the pulley 31 pulls back on the link 20 which pivots on the pivotal connection 21 on the arm 18 and imparts a reciprocating motion to the pusher rod 22 by means of the combined push-pull action of the spring 27 and the link 20, whereby the feeder tube engaging head 23 on the pusher rod 22 is repeatedly brought into contact with the feeder tube 4. This agitates the feeder tube and as a result the binder twine 5 suspended therein is swung back and forth, whereby the arc of its swing will be sufficient to bring said twine into engagement with the material feeding rolls 6 and 7 which capture the twine 5 and draw it into the binding mechanism to start the binding operation.

The facility of the feeder tube agitating attachment is now apparent as is the relatively simple means for connecting the attachment to the baler framework. The overall structure of the attachment is of a nature that is easily assembled and economical to manufacture. Thus, the attachment provides a long needed time saving addition to standard baling equipment in current use and eliminates the necessity for expensive and complex automatic controls, which from an economic standpoint are not available to the majority of farmers who use this type of baler.

I claim as my invention:

1. An attachment for a baler of the type incorporating a movable binder twine feeder tube in conjunction with the bale binding mechanism thereof, comprising a supporting bracket mounted on the framework of said baler in the plane of motion of said binder twine feeder tube, a pusher-rod reciprocably mounted on said bracket in a substantially perpendicular relationship to said feeder tube when said feeder tube is in its position of maximum displacement at the beginning of the bale binding cycle for imparting an impact force to said feeder tube to agitate the same and an actuating linkage for said pusher-rod mounted on said supporting bracket in driving relationship with said pusher-rod, said actuating linkage being spring biased to return said pusher-rod from an extreme actuated position to a non-actuated initial position.

2. An attachment for a baler of the type incorporating a movable binder twine feeder tube in conjunction with the bale binding mechanism thereof, comprising a supporting bracket mounted on the framework of said baler in the plane of motion of said binder twine feeder tube, a pusher-rod reciprocably mounted on said bracket in a substantially perpendicular relationship to said feeder tube when said feeder tube is in its position of maximum displacement at the beginning of the bale binding cycle for imparting an impact force to said feeder-tube to agitate the same, an actuating linkage for said pusher-rod comprising a flexible driving means, a connecting link pivotally mounted intermediate its ends on said supporting bracket in the same plane therewith, said link being connected at its ends to said flexible driving means and said pusher-rod, respectively and a biasing spring connected between said supporting bracket and said connecting link whereby said connecting link and said pusher-rod are spring biased against the action of said flexible driving means.

3. The device as described in claim 2 wherein said supporting bracket comprises two integral arms disposed at right angles to one another, one of said arms being vertically disposed and the other of said arms being horizontally disposed, said vertically disposed arm being attached to a vertical beam on the framework of said baler by a bolt and spacer tube and said horizontally disposed arm being suspended from a cross-brace on said framework by a hook and lock nut mounted on said horizontally disposed arm.

4. The device as described in claim 2 wherein one end of said connecting link is attached to said pusher-rod by means of a bracket, said bracket being pivotally mounted on said link and having an aperture therethrough for receiving one end of said pusher-rod.

5. The device as described in claim 2 wherein said supporting bracket has a vertically disposed arm with the upper portion thereof offset with respect to the vertical.

6. The device as described in claim 5 wherein said flexible driving means is attached to said offset portion of said vertical arm of said supporting bracket by a pulley mounted thereon, the axis of rotation of said pulley being in parallel relationship with said offset portion of said vertical arm.

7. An attachment for a baler of the type incorporating a movable binder twine feeder tube in conjunction with the bale binding mechanism thereof, comprising a supporting bracket mounted on the framework of said baler in the plane of motion of said binder twine feeder tube, means mounted on said supporting bracket for imparting an impact force to said feeder tube when said feeder tube is in its position of maximum displacement at the beginning of the baler binding cycle, an actuating linkage for said means mounted on said supporting bracket in driving relationship with said means, said actuating linkage being spring biased to return said means from an extreme actuated position to an initial non-actuated position.

References Cited in the file of this patent

UNITED STATES PATENTS

| | | |
|---|---|---|
| 2,410,159 | Harrer et al. | Oct. 29, 1946 |
| 2,667,729 | Harrer | Feb. 2, 1954 |